United States Patent
Yao et al.

(10) Patent No.: US 7,256,967 B2
(45) Date of Patent: Aug. 14, 2007

(54) MICRO-ACTUATOR, HEAD GIMBAL ASSEMBLY, DISK DRIVE UNIT AND MANUFACTURING METHOD THEREOF

(75) Inventors: Ming Gao Yao, Dongguan (CN); Masashi Shiraishi, Hong Kong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 507 days.

(21) Appl. No.: 10/873,161

(22) Filed: Jun. 23, 2004

(65) Prior Publication Data

US 2005/0286175 A1    Dec. 29, 2005

(51) Int. Cl.
*G11B 5/60* (2006.01)
(52) U.S. Cl. .................................. 360/291.9
(58) Field of Classification Search .............. 360/294.4
See application file for complete search history.

(56) References Cited

U.S. PATENT DOCUMENTS 6,215,629 B1 *  4/2001  Kant et al. ................. 360/290
6,320,730 B1 *  11/2001 Stefansky et al. ........ 360/294.4
6,570,730 B1 *  5/2003  Lewis et al. .................. 360/75
6,590,748 B2 *  7/2003  Murphy et al. .......... 360/294.4
6,611,399 B1 *  8/2003  Mei et al. ................ 360/234.7
6,879,469 B2 *  4/2005  Liu et al. ................. 360/294.4
6,930,860 B1 *  8/2005  Coffey ..................... 360/294.4

* cited by examiner

*Primary Examiner*—Hoa T. Nguyen
*Assistant Examiner*—Mark Blouin
(74) *Attorney, Agent, or Firm*—Kening Li (57) ABSTRACT

A head gimbal assembly (HGA) including a slider, a micro-actuator and a suspension to load the slider and the micro-actuator. The micro-actuator includes a support base and a piezoelectric unit used for both position displacement adjustment and flying height adjustment. The support base includes a base, a moving plate, and a leading beam to connect with the base and the moving plate. The invention also discloses a method of manufacturing such micro-actuator and HGA, and a structure of a disk drive having the micro-actuator and HGA.

25 Claims, 14 Drawing Sheets

MICRO-ACTUATOR, HEAD GIMBAL ASSEMBLY, DISK DRIVE UNIT AND MANUFACTURING METHOD THEREOF

FIELD OF THE INVENTION

The present invention relates to disk drive units and manufacturing method thereof, and more particularly to a micro-actuator and a head gimbal assembly and manufacturing method thereof.

BACKGROUND OF THE INVENTION

Figure 1A:
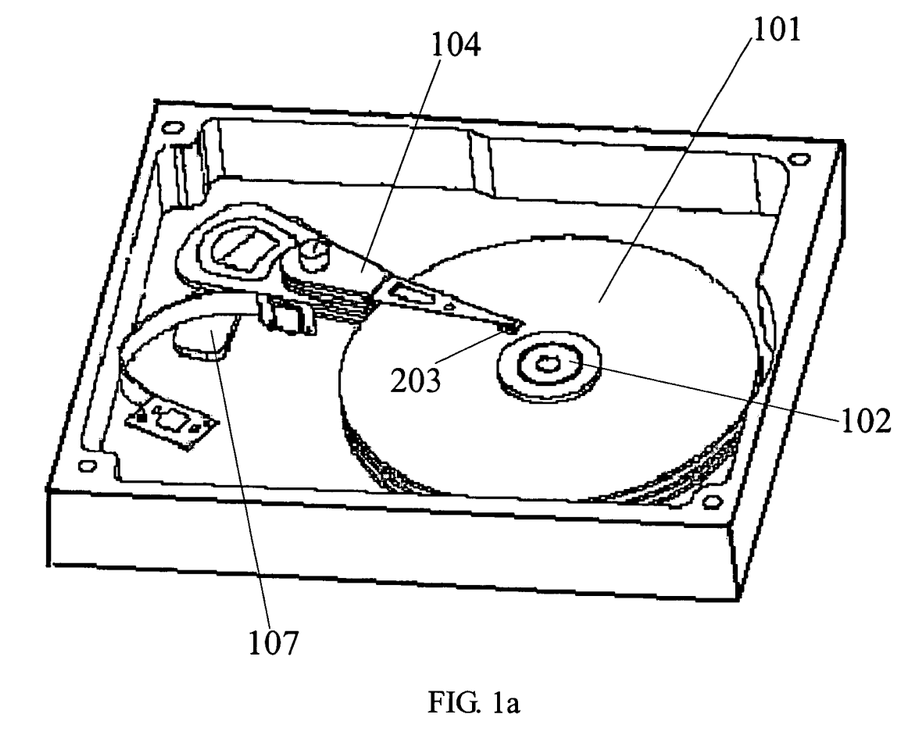
FIG. 1a is a perspective view of a traditional disk drive.
Figure 1B:
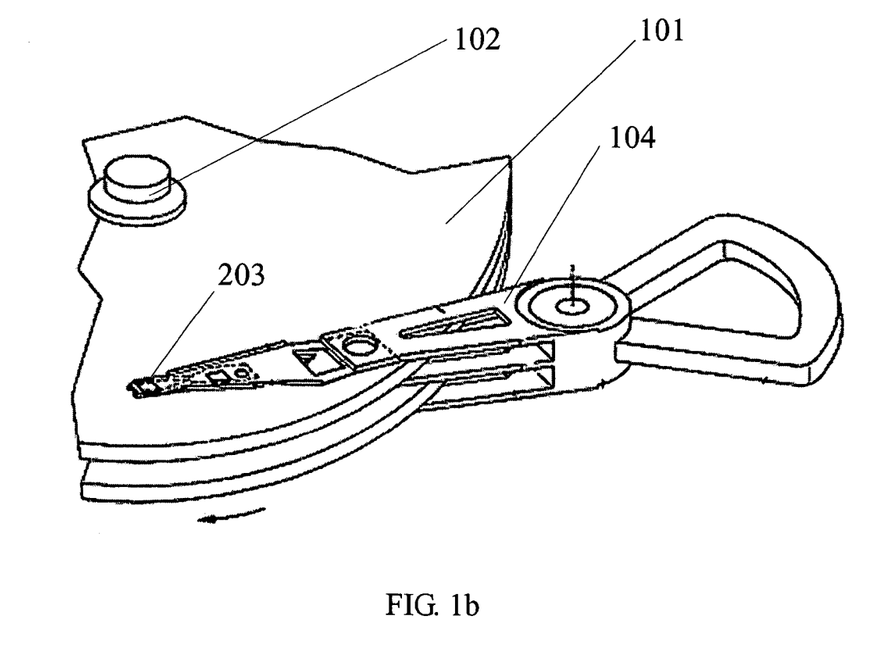

A disk drive stores and retrieves data by positioning a magnetic read/write head over a rotating magnetic data storage disk. Referring to FIGS. 1a and 1b, a typical disk drive in prior art has a drive arm 104 with a slider 203 mounted thereon and a magnetic disk 101. The disk 101 is mounted on a spindle motor 102 which causes the disk 101 to spin and a voice-coil motor (VCM) 107 is provided for controlling the motion of the drive arm 104 with the slider 203 and thus controlling the slider 203 to move from track to track across the surface of the disk 101 to read data from or write data to the disk 101.

However, Because of the inherent tolerance (dynamic play) resulting from VCM that exists in the displacement of the slider 203, the slider 203 can not attain a fine position displacement adjustment.

To solve the above-mentioned problem, piezoelectric (PZT) micro-actuators are now utilized to modify the displacement of the slider. That is, the PZT micro-actuator corrects the displacement of the slider on a much smaller scale to compensate for the tolerance of VCM and the drive arm 104. It enables a smaller recording track width, increases the 'tracks per inch' (TPI) value by 50% of the disk drive unit (also increases the surface recording density).

Figure 1C:
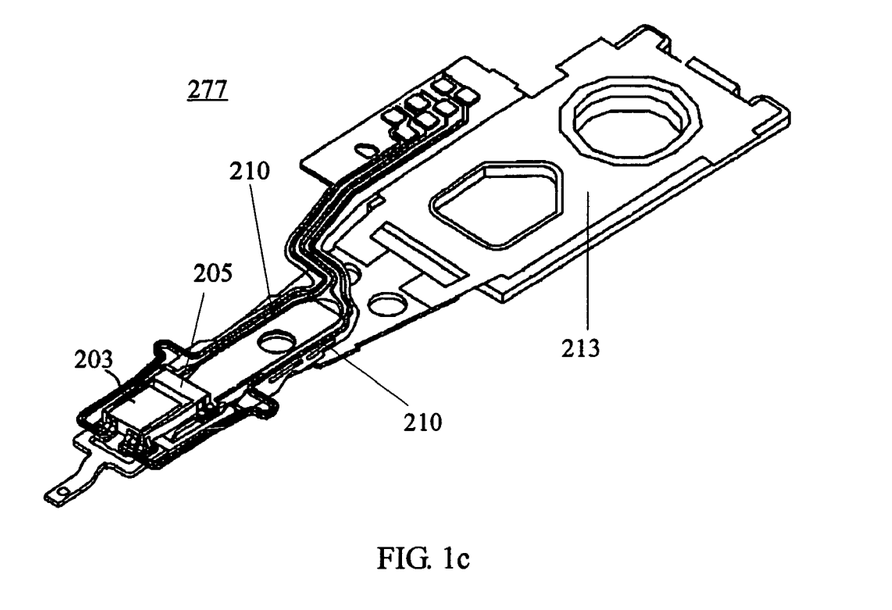
FIG. 1c is a perspective view of a HGA of prior art.
Figure 1D:
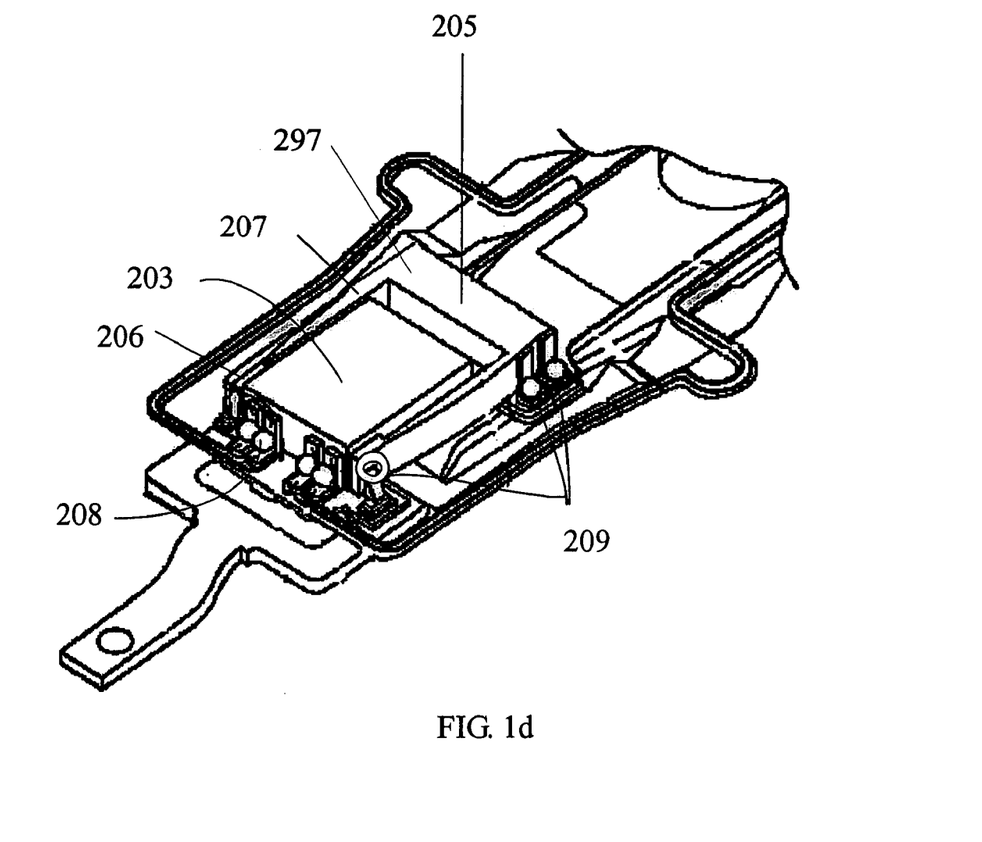
FIG. 1d is an enlarged, partial view of FIG. 1c.
Figure 2:
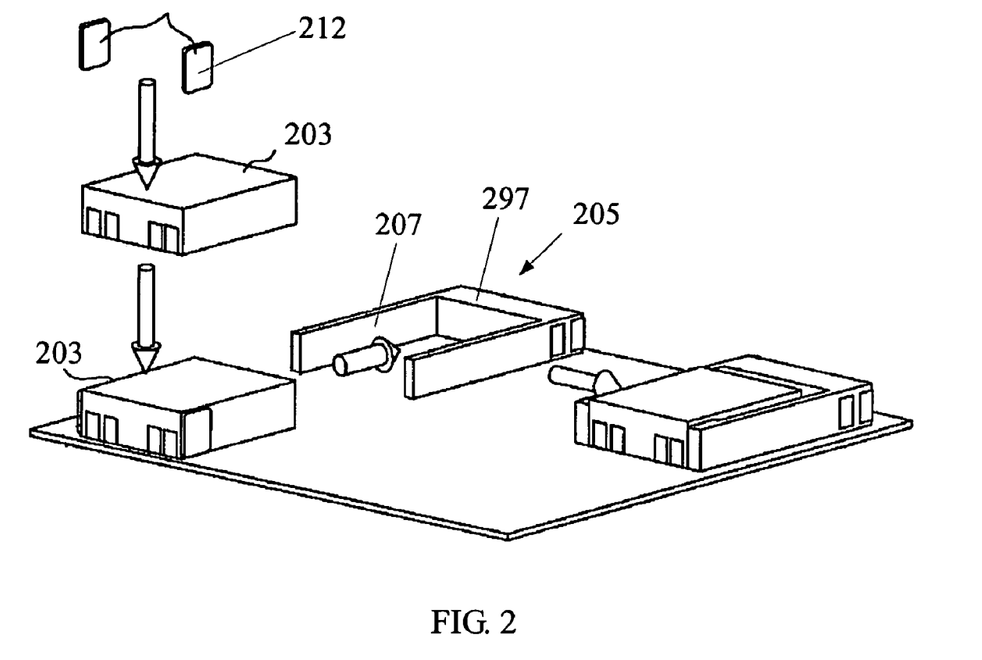
FIG. 2 shows a detailed process of inserting a slider to a micro-actuator of the HGA in FIG. 1c.

Referring to FIG. 1d, a traditional PZT micro-actuator 205 comprises a ceramic U-shaped frame 297 which comprises two ceramic beams 207 with two PZT pieces (not shown) on each side thereof. With reference to FIGS. 1c and 1d, the PZT micro-actuator 205 is physically coupled to a suspension 213, and there are three electrical connection balls 209 (gold ball bonding or solder ball bonding, GBB or SBB) to couple the micro-actuator 205 to the suspension traces 210 in one side of the ceramic beam 207. In addition, there are four metal balls 208 (GBB or SBB) to couple the slider 203 to the suspension 213 for electrical connection. FIG. 2 shows a detailed process of inserting the slider 203 into the micro-actuator 205. The slider 203 is bonded with the two ceramic beams 207 at two points 206 by epoxy dots 212 so as to make the motion of the slider 203 independent of the drive arm 104 (See FIG. 1a).

When power supply is applied through the suspension traces 210, the PZT micro-actuator 205 will expand or contract to cause the U-shaped frame 297 to deform and then make the slider 203 move on the disk 101. Thus a fine position displacement adjustment can be attained.

However, the PZT micro-actuator 205 can only be used for the position displacement adjustment of a head gimbal assembly (HGA) 277 (see FIG. 1c), it cannot be used for flying height adjustment (FH adjustment) of the head gimbal assembly (HGA) 277. As is known to all, flying height is a very important parameter of disk drives. That is, if the flying height is too high, it will affect the ability of slider 203 to read data from or write data to the disk 101; on the contrary, if the flying height is too low, the slider 203 may scratch the disk 101 which will damage the slider 203 and/or the disk 101. In today's disk drive industry, with the rapid increase of disk drive capacity, the track pitch and the track width of disk drive become increasing narrow. Accordingly the flying height of the slider becomes lower, and a fine flying height adjustment for an HGA becomes ever more important.

Also, referring to FIG. 2, in the prior art, the HGA 277 with the micro-actuator 205 is very difficult to manufacture for the following reasons: first, inserting and bonding the slider 203 to the micro-actuator 205 is difficult. Secondly, the epoxy dot 212 is very difficult to control, if the length of the epoxy dot 212 is too long, it will affect the work performance of the micro-actuator 205, for example, the displacement is not enough; if the length of the epoxy dot 212 is too short, the bonding strength will not be enough and then the shock performance is poor. In addition, the epoxy dot 212 is also difficult to control. If the epoxy dot 212 is too high, the height of the epoxy dot 212 will stay on the front or back side of the slider 203. The epoxy dot 212 staying on the front side of the slider 203 will influence the slider 203 flying on the disk 101 and even damage the slider 203 or the disk 101; the epoxy dot 212 staying on the back side of the slider 203 will influence the GBB process of the slider 203.

Furthermore, the micro-actuator 205 has an additional mass which not only influences the static performance, but also the dynamic performance of the suspension 213, such as the resonance performance, so as to reduce resonance frequency and increase the gain of the suspension 213.

Also, the U-shaped frame 297 of the micro-actuator 205 are very brittle, resulting in poor shock performance. It is also a big problem that there is no effective solution to identifying potential micro crack(s) of the U-shaped frame 297. Furthermore, when a voltage is applied to the PZT micro-actuator during normal operation, the back and forth bending of the brittle micro-actuator 205 will generate particles, and influencing the work performance of the micro-actuator 205.

In the manufacture process of HGA 277, since the HGA 277 has a complex configuration, the slider 203 must be tilted when the slider 203 is bonded to the U-shaped frame 297, and the U-shaped frame 297 must be tilted when the U-shaped frame 297 with the slider 203 is bonded to the suspension 213. Both will influence the static attitude of the HGA 277 and accordingly increase the difficulty of manufacturing the HGA 277.

It is well known that polishing is an effective and widely used cleaning method for reducing the micro contamination in the air bearing surface (ABS) of the slider. However, this cleaning method cannot be used in the above-mentioned HGA 277 because it is easy to damage the U-shaped frame 297 of the micro-actuator 205.

Hence, it is desired to provide a micro-actuator, head gimbal assembly, disk drive and manufacturing method thereof which can attain both a fine flying height adjustment and a fine position displacement adjustment, and overcome the above-mentioned shortcomings.

SUMMARY OF THE INVENTION

A feature of the present invention is to provide a micro-actuator, head gimbal assembly, disk drive unit and manufacturing method thereof which can attain both a fine flying height adjustment and a fine position displacement adjustment.

Another feature of the present invention is to provide a micro-actuator, head gimbal assembly, disk drive unit and manufacturing method thereof which can improve the static and dynamic performance and the capacity of the disk drive.

To achieve the above-mentioned features, a head gimbal assembly of the present invention comprises a slider, a micro-actuator and a suspension to load the slider and the micro-actuator. The micro-actuator comprises a support base and a piezoelectric unit used for both position displacement adjustment and flying height adjustment; and the suspension selectively contacts with the support base or the piezoelectric unit.

As an embodiment of the present invention, the piezoelectric unit comprises three piezoelectric elements, two of which are used for position displacement adjustment, and the third one is used for flying height adjustment. The support base comprises a base, a moving plate, and a leading beam to connect the base and the moving plate. The moving plate forms two side beams in its both sides. The piezoelectric elements all are bonded to the same side of the support base. In the present invention, the piezoelectric elements for position displacement adjustment is mounted on two sides of the support base and the piezoelectric element for flying height adjustment are mounted on the middle of the support base. The two piezoelectric elements for position displacement adjustment can cause a slider mounted on the micro-actuator to move in a direction parallel to disk surface. The piezoelectric element for flying height adjustment can cause a slider mounted on the micro-actuator in a direction vertical to disk surface.

In the present invention, each of the piezoelectric elements for position displacement adjustment has an end attached to the base of the support base, and the other end thereof is attached to the side beam of the moving plate; the piezoelectric element for flying height adjustment is attached to the leading beam of the support base. An ACF film is attached to a suspension tongue of the suspension and the micro-actuator is positioned on the ACF film so as to physically and electrically connect with the suspension tongue. The suspension tongue is provided with a plurality of bonding pads thereon, and the piezoelectric unit of the micro-actuator is provided with a plurality of bonding pads corresponding to the bonding pads of the suspension tongue. The bonding pads of the piezoelectric unit are electrically connected with the corresponding bonding pads of the suspension tongue by ACF film or wire bonding.

A method of forming a head gimbal assembly of the present invention comprises the steps of: (1) forming a slider, a suspension and a micro-actuator; (2) coupling the micro-actuator to the suspension physically and electrically, and bonding the slider with the micro-actuator and the suspension electrically and physically. In the present invention, step (2) can be replaced as follows: coupling the slider to the micro-actuator physically and electrically, and bonding the micro-actuator and the slider with the suspension electrically and physically. In the present invention, forming the micro-actuator comprises the steps of: forming a piezoelectric unit with two groups of piezoelectric elements one of which is used for position displacement adjustment and the other is used for flying height adjustment; forming a support base to support the piezoelectric unit; and bonding the piezoelectric unit to the support base. Forming each of the piezoelectric elements comprises forming a plurality of bonding pads thereon. Forming the suspension comprises forming a plurality of bonding pads thereon corresponding to the bonding pads on the piezoelectric elements. Bonding the micro-actuator with the suspension further comprises a step of electrically connecting the bonding pads of the piezoelectric elements with the bonding pads of the suspension by ACF film or wire bonding.

As an embodiment of the present invention, forming the support base comprises forming a moving plate, a base, and a leading beam. Forming each of the moving plate comprises a step of forming two side beams in its both sides. Forming each of the piezoelectric elements comprises forming a plurality of bonding pads provided thereon.

A disk drive unit of the present invention comprises a head gimbal assembly comprising a slider, a micro-actuator, and a suspension; a drive arm to connect with the head gimbal assembly; a disk; and a spindle motor to spin the disk. The micro-actuator comprises a piezoelectric unit used for both position displacement adjustment and flying height adjustment; and a support base to support the piezoelectric unit; wherein the suspension selectively contacts with the support base or the piezoelectric unit. The support base comprises a base, a moving plate, and a leading beam to connect with the base and the moving plate;

Compared with the prior art, the micro-actuator of the present invention provides two groups of piezoelectric elements one of which is used for position displacement adjustment and the other is used for flying height adjustment. Accordingly, both a fine flying height adjustment and a fine position displacement adjustment can be attained by a disk drive unit of the present invention and the TPI of the disk drive unit can be greatly improved.

In addition, the micro-actuator of the present invention provide a new design of the support base made of metal, using the metal support base will greatly improve the shock performance of the micro-actuator and solve the problem of generating particles compare with the traditional ceramic U-shaped frame.

Due to the complex manufacturing process, it is difficult to control the static attitute in the prior art. However, the present invention provides a similar manufacture process but is much better for HGA static attitude control. The method of the present invention can also use the traditional method to control it.

Compared to the traditional method, the invention is also better for particle contamination control in the manufacturing process. In addition, the traditional polishing cleaning method can be used for cleaning process in the present invention. The present invention also can reduce the voltage of operating the thin film PZT micro-actuator and achieve the same displacement as the prior micro-actuator.

For the purpose of making the invention easier to understand, several particular embodiments thereof will now be described with reference to the appended drawings in which:

DESCRIPTION OF THE DRAWINGS

FIG. 1b is an enlarged, partial view of FIG. 1a;

DETAILED DESCRIPTION OF THE INVENTION

Figure 3:
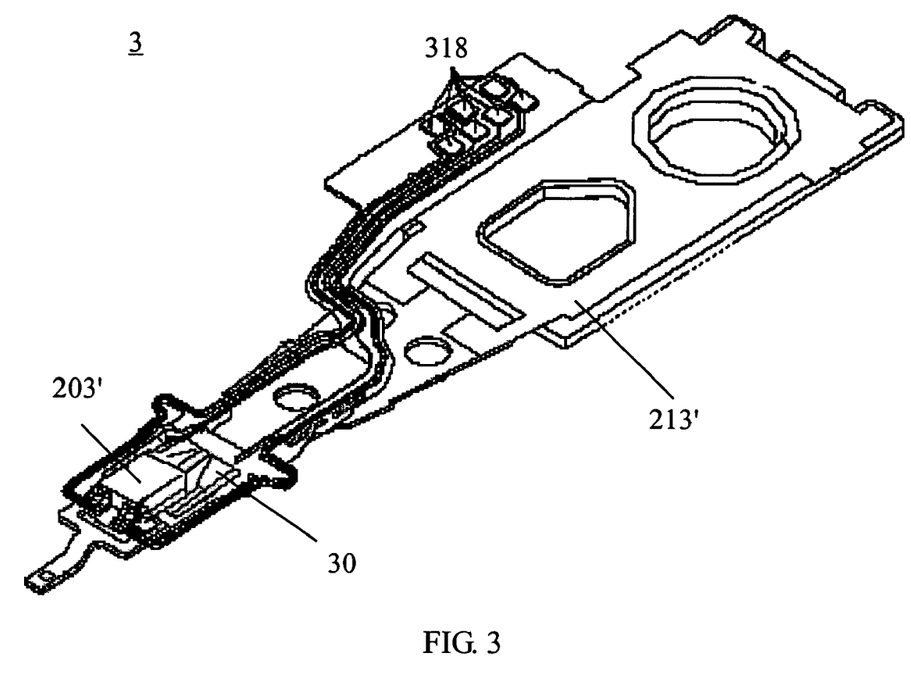
FIG. 3 is a perspective view of a HGA according to a first embodiment of the present invention.

Referring to FIG. 3, a head gimbal assembly (HGA) 3 of the present invention comprises a slider 203', a micro-actuator 30 and a suspension 213' to load the slider 203' and the micro-actuator 30.

Figure 4:
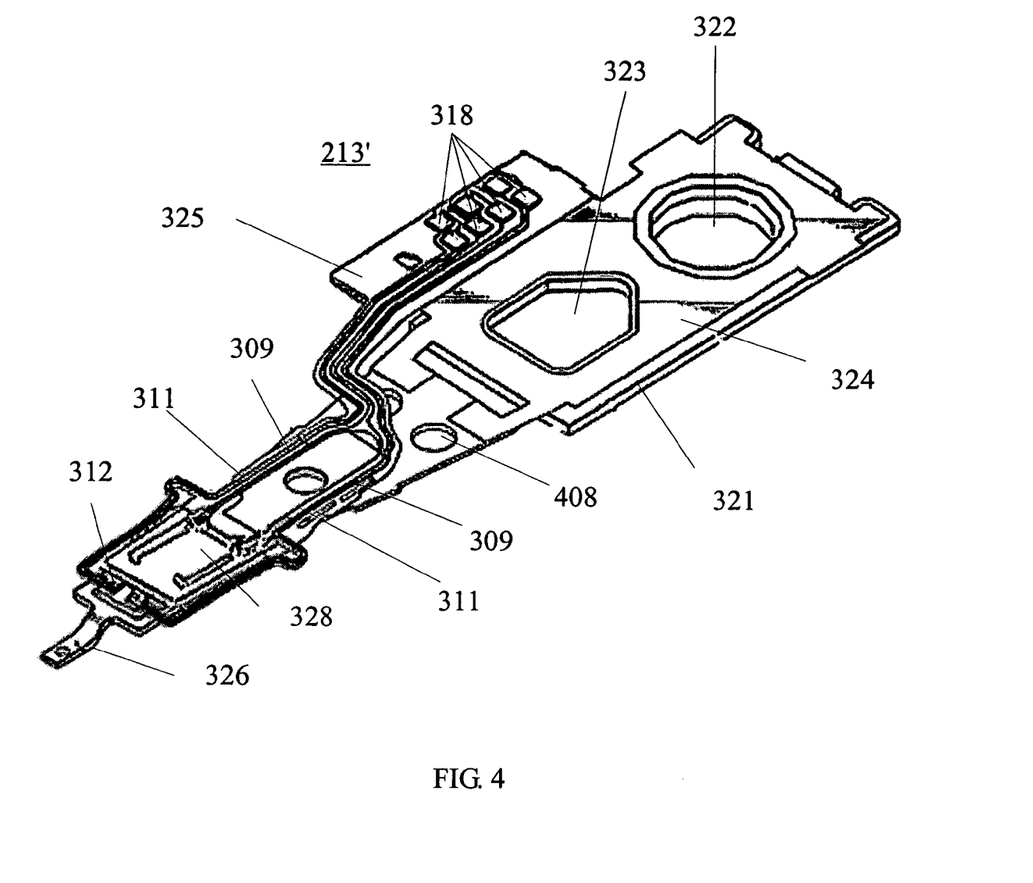
FIG. 4 is a perspective view of a suspension of the HGA in FIG. 3.
Figure 5:
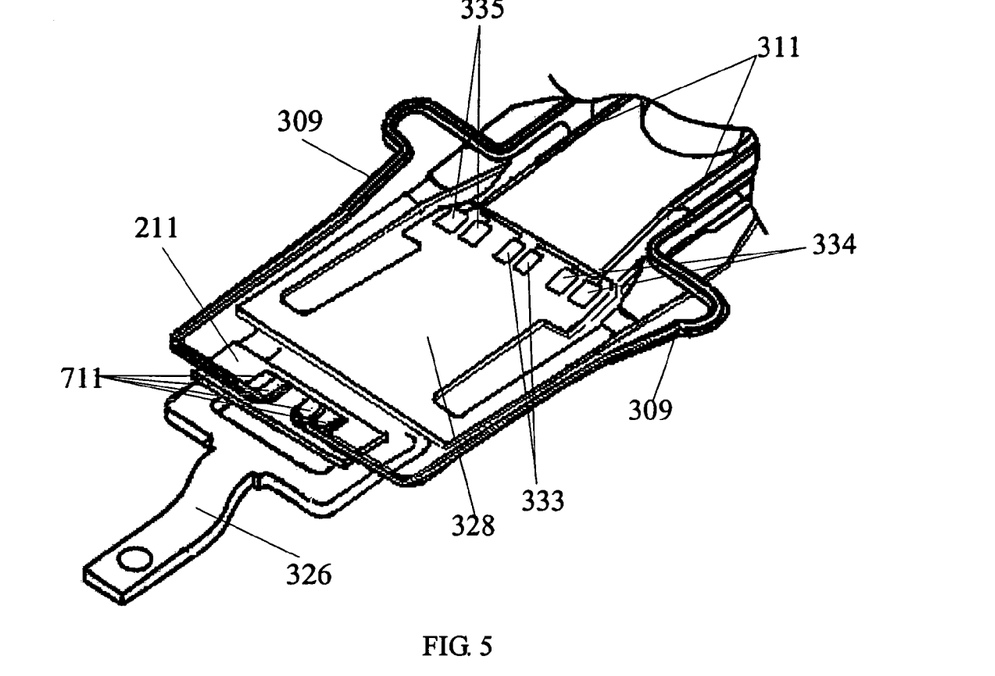
FIG. 5 is an enlarged, partial perspective view to show a suspension tongue of the suspension in FIG. 4.
Figure 11:
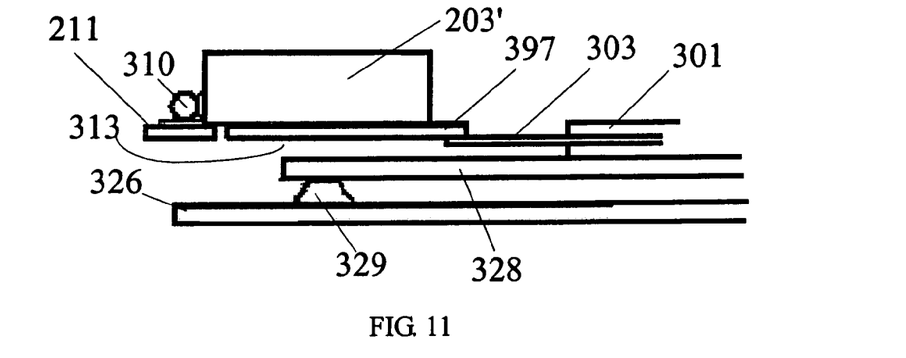
FIG. 11 is a cross-sectional view of the HGA of FIG. 3 in the micro-actuator area.

With reference to FIG. 4, the suspension 213' comprises a load beam 326, a flexure 325, a hinge 324 and a base plate 321. The load beam 326 has three openings 408 formed therein as lamination datum hole and a plurality of dimples 329 (see FIG. 11) formed thereon as well. In the hinge 324 and the base plate 321 there are formed two holes 322 and 323, respectively. The hole 322 is used for swaging the HGA 3 with the drive arm (not shown) and the hole 323 is used to reduce the weight of the suspension 213'. On the flexure 325 a plurality of connection pads 318 are provided to connect with a control system (not shown) at one end and a plurality of electrical multi-traces 309, 311 is provided at the other end. Referring to FIGS. 4, 5 and 11, the flexure 325 also comprises a suspension tongue 328 and a moving part 211 with a plurality of bonding pads 711 thereon. The suspension tongue 328 is used to support the micro-actuator 30 and keep the loading force always being applied to the center area of the slider 203' through the dimples 329 of the load beam 326. Also, a plurality of electrical bonding pads 335, 333 and 334 are formed on the suspension tongue 328.

Figure 6:
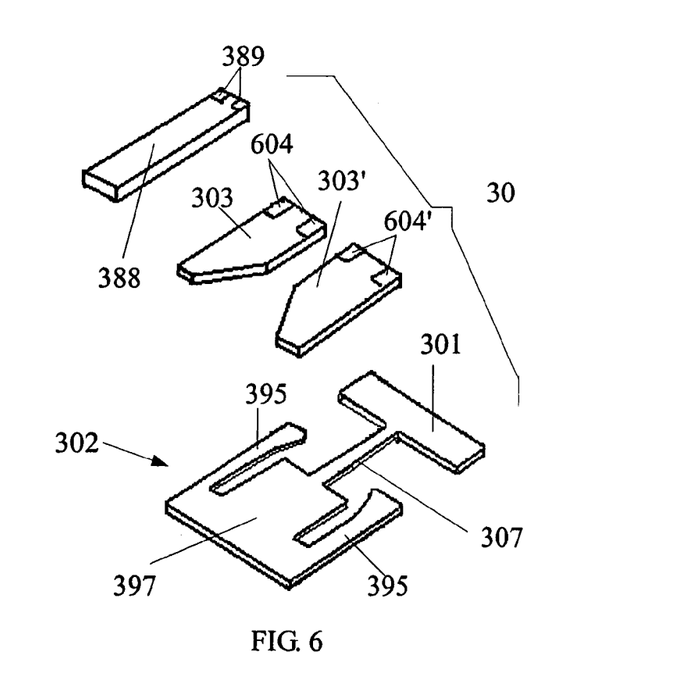
FIG. 6 is an exploded, perspective view of a micro-actuator of the present invention.

Referring to FIG. 6, the micro-actuator 30 comprises a metal support base 302 and a piezoelectric (PZT) unit. In the present invention, the support base 302 is preferably made of stainless steel. The support base 302 comprises a moving plate 397, a base 301, and a leading beam 307 to connect the moving plate 397 and the base 301. As an embodiment of the present invention, the moving plate 397 forms two side beams 395 in its both sides and the width of the leading beam 307 is narrower than that of the moving plate 397. In the present invention, the PZT unit comprises two side PZT pieces 303, 303' and a middle PZT piece 304 with two bonding pads 389 thereon. As an embodiment of the invention, the middle PZT piece 388 is shaped like a cuboid. The side PZT piece 303 forms two electrical bonding pads 604 on an end thereof and the side PZT piece 303' forms two electrical bonding pads 604' on its end as well. The side PZT pieces 303, 303' and the middle PZT piece 388 are preferably made of thin film PZT which can be a single layer structure or a multi-layer structure. Also, the side PZT pieces 303, 303' and the middle PZT piece 388 can be made of ceramic PZT.

Figure 7A:
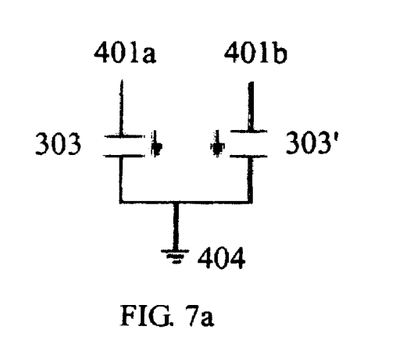
FIG. 7a shows an electrical connection relationship of two side PZT pieces of the micro-actuator of FIG. 6, which have a same polarization direction according to an embodiment of the present invention.
Figure 7B:
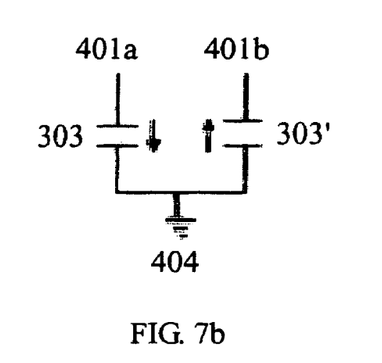
FIG. 7b shows an electrical connection relationship of two side PZT pieces of the micro-actuator of FIG. 6, which have opposing polarization directions according to another embodiment of the present invention.
Figure 7C:
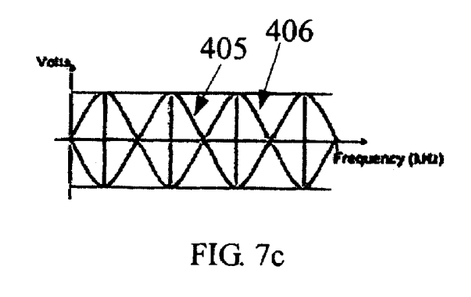
FIG. 7c shows two waveforms of voltages which are applied to the two side PZT pieces of FIG. 7a, respectively.
Figure 7D:
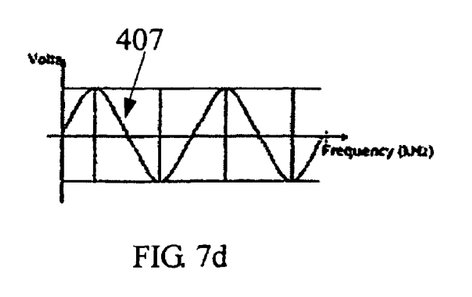
FIG. 7d shows a waveform of voltage which is applied to the two side PZT pieces of FIG. 7b, respectively.
Figure 7E:
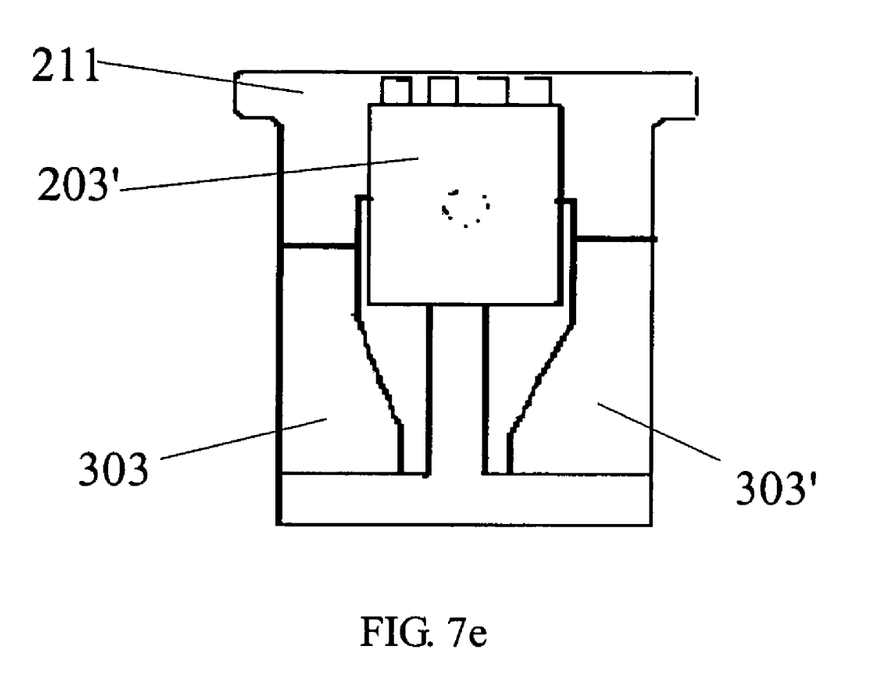
FIG. 7e shows a status of the two side PZT pieces without being excited.
Figure 7F:
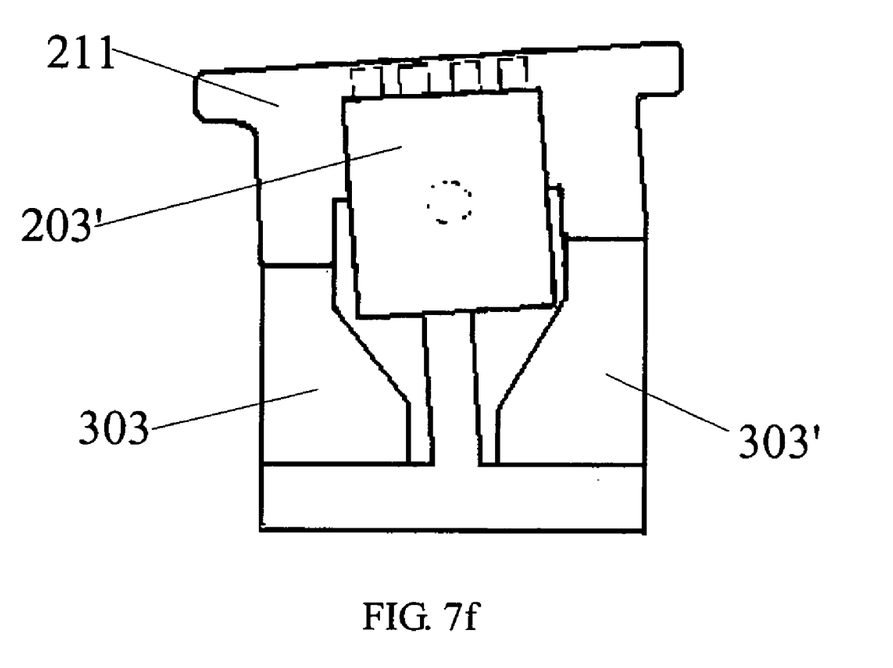
FIGS. 7f and 7g show two different operation methods of the two side PZT pieces in FIG. 7a which cause the slider to move in a direction parallel to disk surface.
Figure 7G:
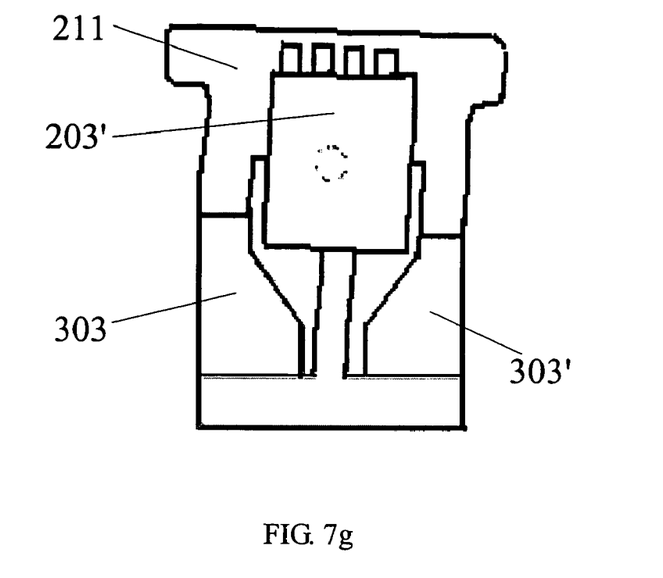

FIGS. 7a, 7c, 7e, 7f and 7g show a first operation method of the two side PZT pieces 303, 303' for performing position displacement adjustment function. In the embodiment, the two side PZT pieces 303, 303' have the same polarization direction, as shown in FIG. 7a, which are commonly grounded by one end 404 and the other ends 401a and 401b thereof are applied two voltages with opposing phases of the waveforms 405 and 406, as shown in FIG. 7c. Referring to FIG. 7e, the two side PZT pieces 303, 303' will stay on its original position when no voltage is applied thereto; if under the drive of the voltages, referring to FIG. 7f, the side PZT piece 303' will expand while the side PZT piece 303 contracts during the same half period. Once the voltages go to next half period, referring to FIG. 7g, the two side PZT pieces 303, 303' will change their phases and the side PZT piece 303' will contract while the side PZT piece 303 will expand. This will cause the slider 203' with the moving part 211 to move in a direction parallel to disk surface and thus attain a position displacement adjustment.

FIGS. 7b and 7d show another operation method of the two side PZT pieces 303, 303' for performing the position displacement adjustment function. In the embodiment, the two side PZT pieces 303 have two opposing polarization directions, as shown in FIG. 7b, which are also commonly grounded by one end 404 and the other ends 401a and 401b thereof are applied two voltages with the same waveform 407 (see FIG. 7d). Also referring to FIGS. 7f and 7g, under the drive of the voltages, the side PZT piece 303' will expand while the other side PZT piece 303 contracts during the same half period, and when the voltages go to next half period, the side PZT piece 303' will contract while the other side PZT piece 303 expands. The slider 203' with the moving part 211 is thus circularly moved from right side to left side and then returns back from left side to right side.

Figure 7H:
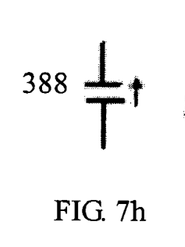
FIGS. 7h and 7i show two different polarization directions of a middle PZT piece of the micro-actuator of FIG. 6 according to two embodiments of the present invention.
Figure 7I:
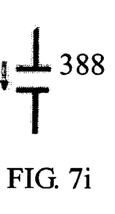
Figure 7J:
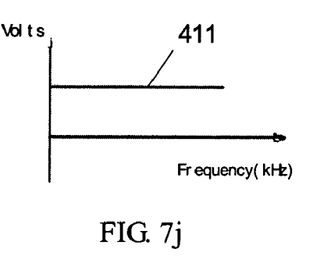
FIGS. 7j and 7m show two different voltages which are applied to the middle PZT piece of FIGS. 7h and 7i, respectively.
Figure 7K:
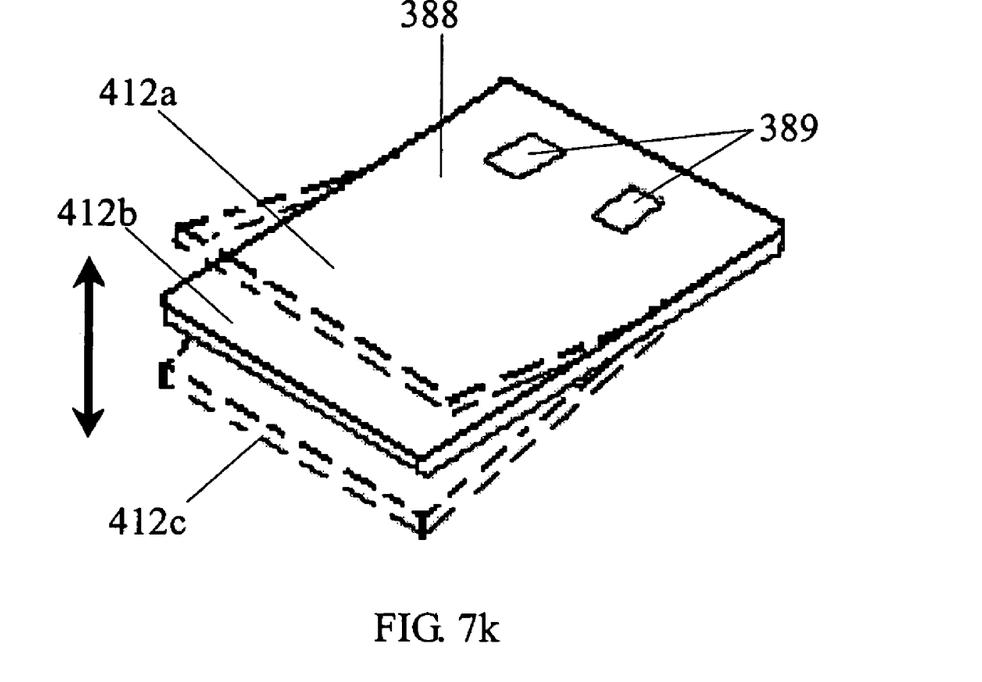
FIG. 7k shows two operation methods of the middle PZT piece in FIG. 7h or 7i, which causes the slider to move in a direction vertical to disk surface.
Figure 7M:
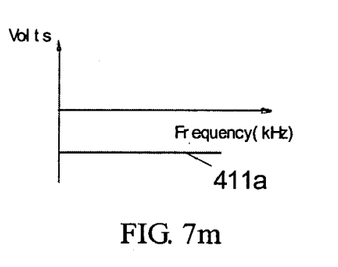

FIGS. 7h and 7i show two different polarization directions which may be used by the middle PZT piece 388. FIG. 7k shows an operation method of the middle PZT piece 388 for performing a FH adjustment function, the middle PZT piece 388 is applied a DC voltage 411 or 411a, as shown in FIGS. 7j and 7m. Referring to FIG. 7k, when no voltage is applied, the middle PZT piece 388 will stay on its original position 412*b*; when a positive DC voltage 411 is applied, the middle PZT piece 388 will bend upward to a position 412*a*; and when a negative DC voltage 411*a* is applied, the middle PZT piece 388 will bend downward to a position 412*c*. Thus the static pitch of the suspension 213' will change and the static attitude of the slider 203' will change together, and a FH adjustment of the slider 203' can be achieved.

Figure 8:
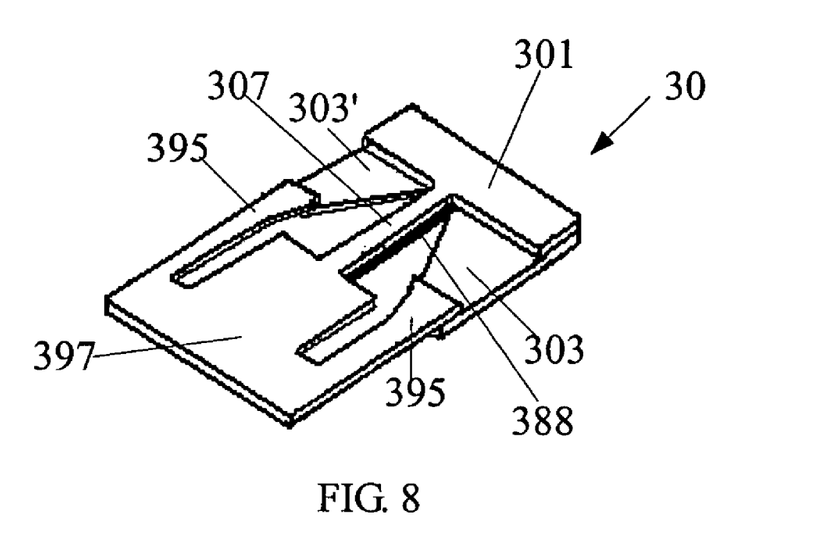
FIG. 8 is a perspective view of the assembled micro-actuator of FIG. 6.
Figure 12:
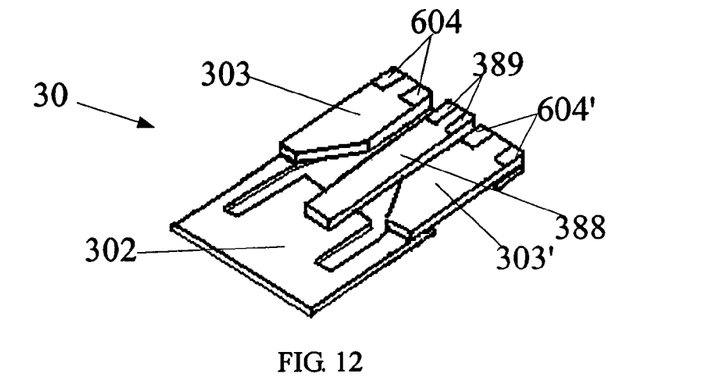
FIG. 12 shows another perspective view of the assembled micro-actuator of FIG. 8.

Referring to FIGS. 6, 8 and 12, a process for forming a micro-actuator 30 comprises the steps of: firstly, providing a support base 302, two side PZT pieces 303, 303' and a middle PZT piece 388; then bonding the two side PZT pieces 303, 303' to both sides of the support base 302 and bonding the middle PZT piece 304 to the middle of the support base 302. As an embodiment of the invention, one end of the side PZT pieces 303 is attached to the base 301 of the support base 302, and the other end thereof is attached to the side beam 395 of the moving plate 397; the bonding method of the side PZT pieces 303' is similar to that of the side PZT pieces 303. The middle PZT piece 388 is attached to the leading beam 307 of the support base 302. In the present invention, the two side PZT pieces 303, 303' and the middle PZT piece 388 are bonded with the support base 302 by traditional method, such as adhesive bonding, epoxy bonding, or ACF bonding.

Figure 9A:
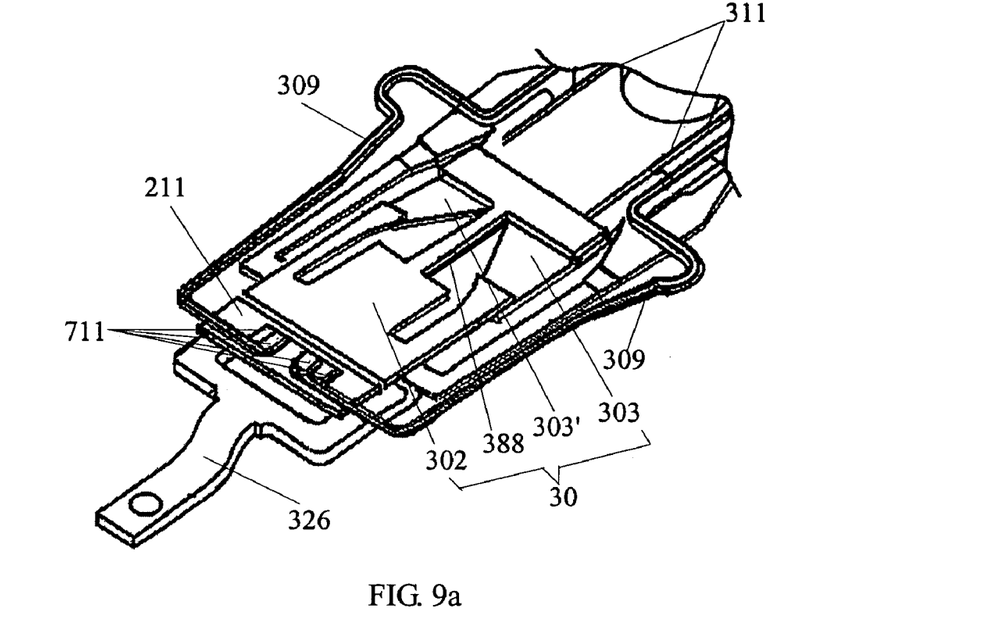
FIG. 9a is a partial, perspective view of the suspension of FIG. 4 with the micro-actuator of FIG. 6 mounted thereon.
Figure 10:
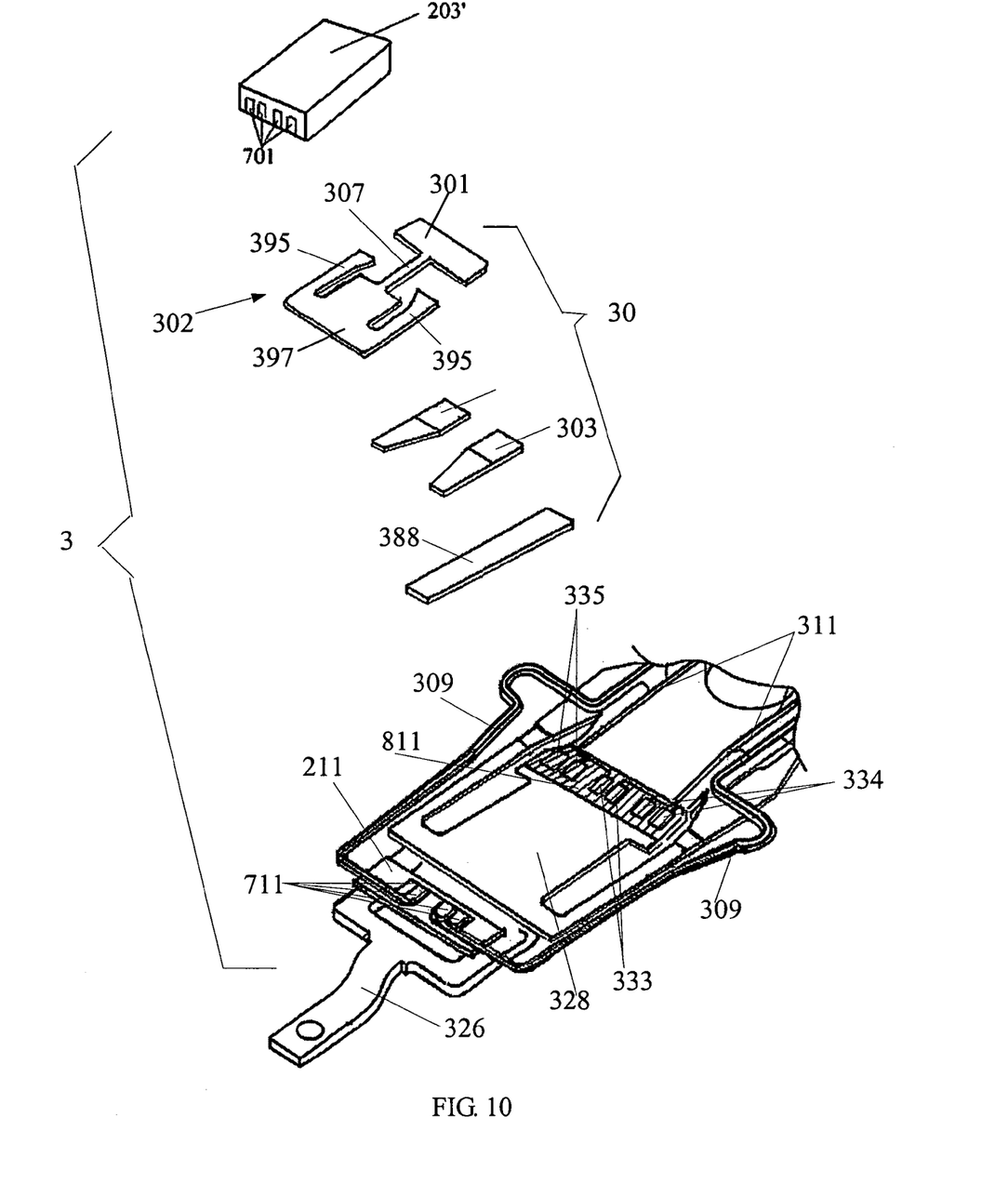
FIG. 10 is an exploded, partial, perspective view of the HGA of FIG. 3.

Referring to FIGS. 5 and 10, as an embodiment of the present invention, an ACF film 811 is attached to the suspension tongue 328 and then the micro-actuator 30 is positioned on the ACF film 811 with the two side PZT pieces 303, 303' and the middle PZT piece 388 contacting with the suspension tongue 328 and the ACF film 811, thus a physical and electrical connection between the micro-actuator 30 and the suspension tongue 328 is established, as shown in FIG. 9*a*. Accordingly, referring to FIGS. 6 and 10, the bonding pads 604, 604', and 389 of the micro-actuator 30 are positioned on and electrically connected with the bonding pads 334, 335 and 333 of the suspension tongue 328, and then electrically connected with the connection pads 318 (see FIG. 4) through the electrical multi-traces 311.

Subsequently, referring to FIGS. 9*b*, 10 and 11, the slider 203' is positioned on the micro-actuator 30 and coupled with the leading beam 307 of the support base 302 physically and electrically by ACF or adhesive bonding. The physical coupling can keep the slider 203' moving together with the micro-actuator 30, and the electrical coupling help to prevent electro static discharge (ESD) damage of the slider 203'. At the same time, a plurality of slider pads 701 of the slider 203' are positioned corresponding to the bonding pads 711 on the moving part 211. Also, a parallel gap 313 is thus formed between the micro-actuator 30 and the suspension tongue 328 so as to ensure the smooth movement of the micro-actuator 30.

Figure 9B:
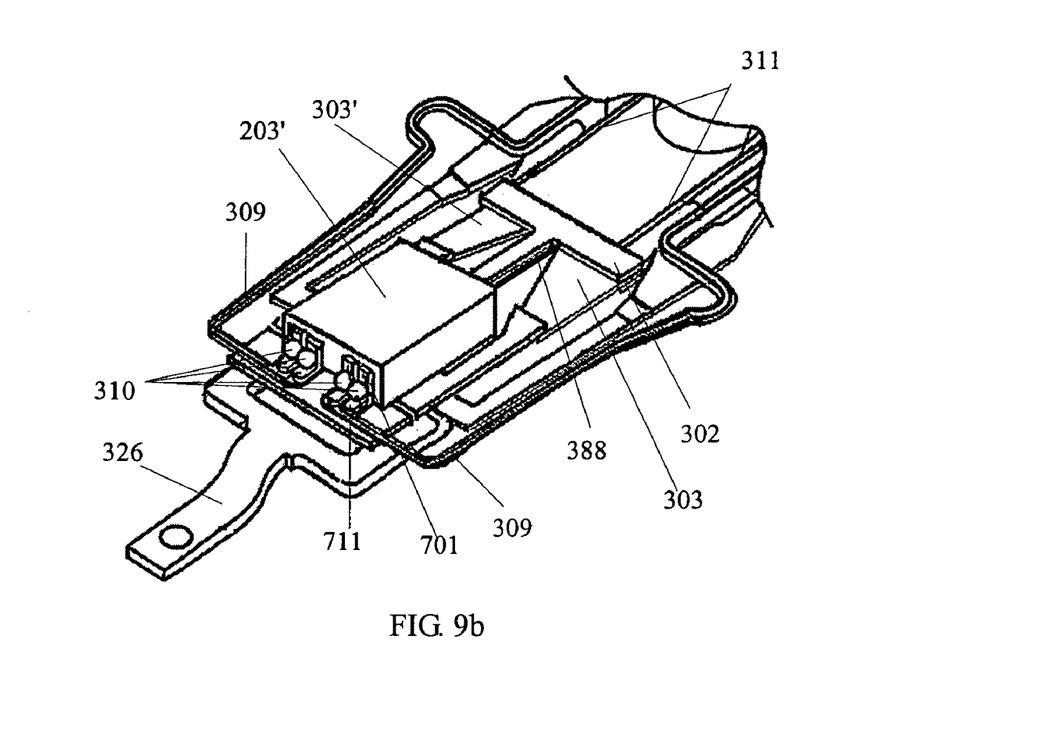
FIG. 9b is a partial, perspective view of the HGA of FIG. 3.

Then, referring to FIG. 9*b*, four metal balls 310 (GBB or SBB) are used to electrically connect the slider pads 701 with the bonding pads 711 so as to electrically connect the slider 203' with the two electric multi-traces 309 of the suspension 213'. Through the electric multi-traces 309, 311, the connection pads 318 electrically connects the slider 203' and the micro-actuator 30 with the control system (not shown).

Figure 13:
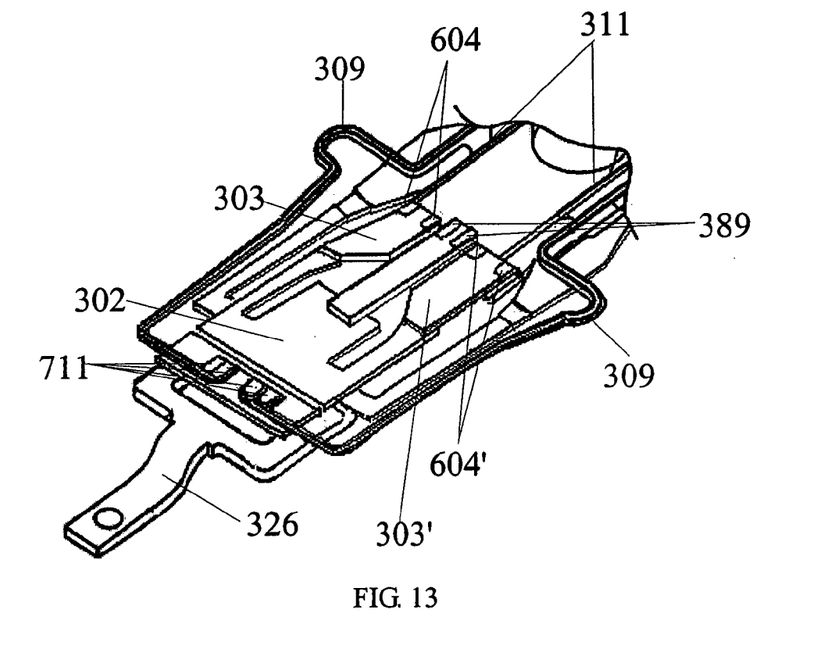
FIG. 13 shows another assembly method of the micro-actuator of FIG. 8 which are mounted on the suspension of FIG. 4.
Figure 14:
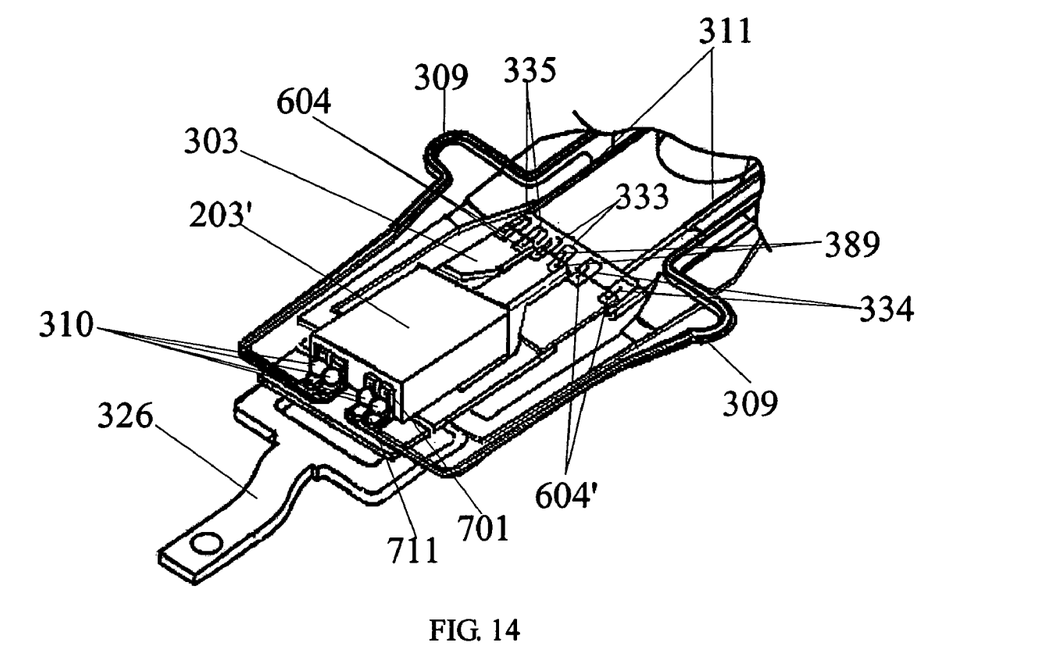
FIG. 14 is a partial, perspective view of a HGA with the micro-actuator mounted thereon by the assembly method of FIG. 13.
Figure 15:
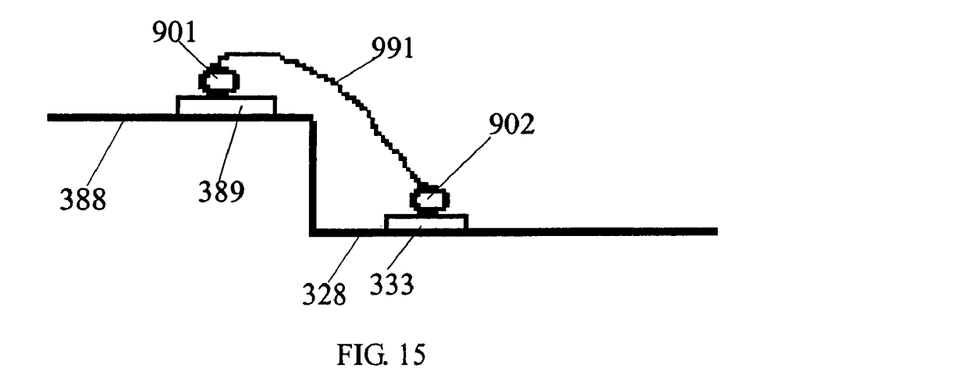
FIG. 15 shows an electrical connection relationship between the micro-actuator and the suspension of the HGA in FIG. 14.

In another embodiment of the present invention, referring to FIG. 13, the micro-actuator 30 can be positioned on the suspension tongue 328 with the support base 302 contacting with the suspension tongue 328 and the ACF film 811. Also, referring to FIG. 14, the bonding pads 604, 604', and 389 of the micro-actuator 30 expose outwardly and electrically connect with the bonding pads 335, 334 and 333 of the suspension tongue 328. Then, the slider 203' is mounted on the micro-actuator 30. In an embodiment of the present invention, taking the bonding pad 389 of the middle PZT piece 388 as an example, referring to FIG. 15, the electrical connection is performed as follows: bonding a metal ball 901 (such as gold ball bonding, solder ball bonding, or laser welding) which is formed by melting a section of wire 991 output from a bonding device (not shown) in the bonding pad 389 of the middle PZT piece 388 firstly, and then moving the bonding device to the bonding pad 333 of the suspension tongue 328 to form another metal ball 902 thereon without cutting off the wire 991. In the embodiment, no other change except the above-mentioned is made on the structure and assembly of the HGA of the present invention. Therefore, a detailed description thereof is omitted herefrom.

After the above assembly, a PZT performance test is applied to the micro-actuator 30. The test shows that the micro-actuator 30 satisfies the requirement for the adjustment capability for flying height (FH) adjustment and the requirement for the adjustment capability for position displacement adjustment as well. In an embodiment of the present invention, the slider 203' can be coupled to the micro-actuator 30 physically and electrically firstly, and then bonding the micro-actuator 30 and the slider 203' with the suspension 213' electrically and physically.

In the present invention, a disk drive of the present invention can be attained by assembling a disk drive base plate, a disk, a spindle motor, a VCM with the HGA of the present invention. Because the structure and/or assembly process of a HGA and hard disk drive by using the micro-actuator of the present invention are well known to persons ordinarily skilled in the art, a detailed description of such structure and assembly is omitted herefrom.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A head gimbal assembly comprising:
   a slider;
   a micro-actuator; and
   a suspension to load the slider and the micro-actuator;
   wherein
   the micro-actuator comprises a support base and a piezoelectric unit used for both position displacement adjustment and flying height adjustment, and the piezoelectric unit comprises three piezoelectric elements, two of which are used for position displacement adjustment, and the third one is used for flying height adjustment.

2. The head gimbal assembly as claimed in claim 1, wherein the piezoelectric elements are thin film piezoelectric elements or ceramic piezoelectric elements.

3. The head gimbal assembly as claimed in claim 1, wherein the support base comprises a base, a moving plate, and a leading beam to connect the base and the moving plate.

4. The head gimbal assembly as claimed in claim 3, wherein the piezoelectric elements all are bonded to the same side of the support base.

5. The head gimbal assembly as claimed in claim 1, wherein an ACF film is attached to a suspension tongue of the suspension and the micro-actuator is positioned on the ACF film so as to physically and electrically connect with the suspension tongue.

6. The head gimbal assembly as claimed in claim 5, wherein the suspension tongue is provided with a plurality of bonding pads thereon, and the piezoelectric unit of the micro-actuator is provided with a plurality of bonding pads corresponding to the bonding pads of the suspension tongue.

7. The head gimbal assembly as claimed in claim 6, wherein the bonding pads of the piezoelectric unit are electrically connected with the corresponding bonding pads of the suspension tongue by ACF film or wire bonding.

8. A method of forming a head gimbal assembly comprising the steps of:
(1) forming a slider, a suspension and a micro-actuator; and
(2) coupling the micro-actuator to the suspension physically and electrically, and bonding the slider with the micro-actuator and the suspension electrically and physically; coupling the slider to the micro-actuator physically and electrically, and bonding the micro-actuator and the slider with the suspension electrically and physically; wherein
forming the micro-actuator comprises the steps of:
forming a piezoelectric unit for both position displacement adjustment and flying height adjustment, wherein
forming the piezoelectric unit comprises forming three piezoelectric elements, two of which are used for position displacement adjustment and the third one is used for flying height adjustment;
forming a support base to support the piezoelectric unit; and
bonding a piezoelectric unit to the support base.

9. The method of forming a head gimbal assembly as claimed in claim 8, wherein forming each of piezoelectric element comprises forming a plurality of bonding pads thereon.

10. The method of forming a head gimbal assembly as claimed in claim 9, wherein forming the suspension comprises forming a plurality of bonding pads thereon corresponding to the bonding pads on the piezoelectric elements.

11. The method of forming a head gimbal assembly as claimed in claim 10, wherein bonding the micro-actuator with the suspension further comprises electrically connecting the bonding pads of the piezoelectric elements with the bonding pads of the suspension by ACF film or wire bonding.

12. A micro-actuator comprises:
a piezoelectric unit used for both position displacement adjustment and flying height adjustment; and
a support base to support the piezoelectric unit, wherein the piezoelectric unit comprises three piezoelectric elements, two of which are used for position displacement adjustment, and the third one is used for flying height adjustment.

13. The head gimbal assembly as claimed in claim 12, wherein the piezoelectric elements are thin film piezoelectric elements or ceramic piezoelectric elements.

14. The micro-actuator as claimed in claim 12, wherein the piezoelectric elements all are bonded to the same side of the support base.

15. The micro-actuator as claimed in claim 12, wherein the two piezoelectric elements for position displacement adjustment can cause a slider mounted on the micro-actuator to move in a direction parallel to disk surface.

16. The micro-actuator as claimed in claim 12, wherein the piezoelectric element for flying height adjustment can cause a slider mounted on the micro-actuator in a direction vertical to disk surface.

17. The micro-actuator as claimed in claim 12, wherein the support base comprises a base, a moving plate, and a leading beam to connect with the base and the moving plate.

18. The micro-actuator as claimed in claim 17, wherein each of the piezoelectric elements for position displacement adjustment has one end attached to the base of the support base, and the other end thereof is attached to the moving plate; and the piezoelectric element for flying height adjustment is attached to the leading beam of the support base.

19. The micro-actuator as claimed in claim 12, wherein each of the piezoelectric elements has a plurality of bonding pads provided thereon.

20. A method of forming a micro-actuator comprises the steps of:
forming a piezoelectric unit for both position displacement adjustment and flying height adjustment;
forming a support base; bonding the piezoelectric unit to one side of the support base, wherein
forming the piezoelectric unit comprises forming two piezoelectric elements used for position displacement adjustment and a piezoelectric element for flying height adjustment.

21. The method of forming a micro-actuator as claimed in claim 20, wherein forming the support base comprises forming a moving plate, a base, and a leading beam.

22. The method of forming a micro-actuator as claimed in claim 20, wherein forming each of the piezoelectric elements comprises forming a plurality of bonding pads provided thereon.

23. A disk drive unit comprising:
a head gimbal assembly comprising a slider, a micro-actuator, and a suspension;
a drive arm to connect with the head gimbal assembly;
a disk; and
a spindle motor to spin the disk; wherein the micro-actuator comprises:
a piezoelectric unit used for both position displacement adjustment and flying height adjustment, wherein the piezoelectric unit comprises three piezoelectric elements, two of which are used for position displacement adjustment, and the third one is used for flying height adjustment; and
a support base to support the piezoelectric unit.

24. The disk drive unit as claimed in claim 23, wherein the support base comprises a base, a moving plate, and a leading beam to connect with the base and the moving plate.

25. The disk drive unit as claimed in claim 23, wherein the piezoelectric elements are thin film piezoelectric elements or ceramic piezoelectric elements.

* * * * *